Feb. 18, 1969    F. C. SCHULTZ    3,427,863
METHOD AND APPARATUS FOR THE DIRECT DETERMINATION OF GASES
Original Filed April 5, 1963    Sheet 1 of 2

INVENTOR:
Frederick C. Schultz
BY
Wupper, Gradolph & Love
attys

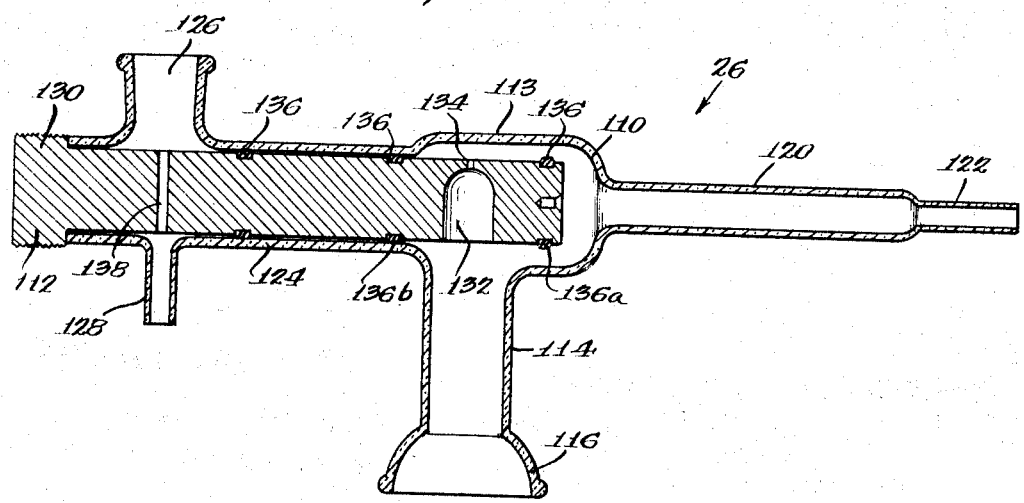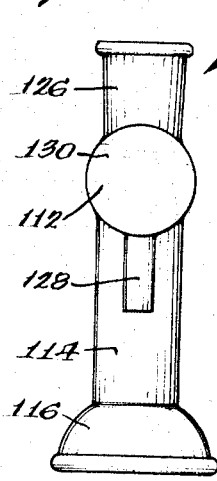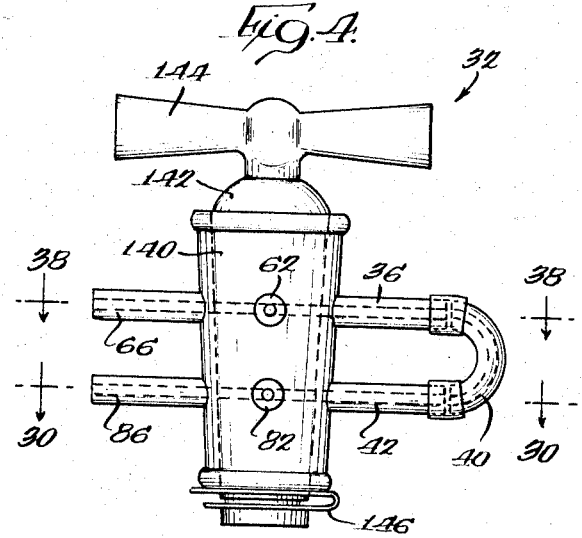

United States Patent Office 3,427,863
Patented Feb. 18, 1969

3,427,863
METHOD AND APPARATUS FOR THE DIRECT DETERMINATION OF GASES
Frederick C. Schultz, St. Joseph, Mich., assignor to Laboratory Equipment Corporation, St. Joseph, Mich., a corporation of Michigan
Continuation of application Ser. No. 270,974, Apr. 5, 1963. This application Nov. 21, 1966, Ser. No. 597,196
U.S. Cl. 73—23.1                2 Claims
Int. Cl. G01n 31/08, 7/00

ABSTRACT OF THE DISCLOSURE

Method and apparatus for the direct analytical determination of gases in samples which comprise heating the sample in a stream of carrier gas to release the gases to be determined and entrain them in the stream, trapping the gases out of the stream in a cold trap, disconnecting the cold trap from that stream and connecting it in a second stream of carrier gas flowing through a measuring cell, and heating the trap to release the trapped gases therefrom.

---

This is continuation of application Ser. No. 270,974, filed Apr. 5, 1963, now abandoned.

My invention relates to a method and apparatus for the direct determination of gases either individually or in a mixture if they are chromatographically separable. More specifically, my invention is directed to the determination of gases or gas-forming components in or of solid or liquid substance.

The chromatographic apparatus and method of my invention has many notable advantages over any others I have seen. It measures the total gas content of a sample rather than just an aliquot part thereof with the attendant elimination of error inherent in proportioning. It is quick and easy to operate. A sample may be processed in as little as fifteen minutes, and two samples may be in the apparatus simultaneously at different stages in processing so as to permit readings on consecutive samples at five minute intervals. The apparatus is remarkably free from error in that a bridge is employed for measuring whereby errors may be balanced out prior to a sample determination.

There are a number of specific elements incorporated in my method or apparatus which are also worthy of note. I employ a sample loading device which is leak-proof and which permits the introduction of large samples into the apparatus with a minimum of contaminating air.

My apparatus also includes a novel transfer stopcock whereby several passage connections for the flow of gases can be changed by a single motion. My apparatus likewise contains provision whereby the desired gas quantities can be read directly rather than interpolated from a strip chart reading.

Other objects and advantages of my invention will be apparent from the following description and drawings of which:

FIG. 2 is a central longitudinal vertical section through the sample loading device;

FIG. 3 is an end elevation of the loading device looking at the left end of FIG. 2;

FIG. 4 is a side elevation of the transfer stopcock;

Figure 1:
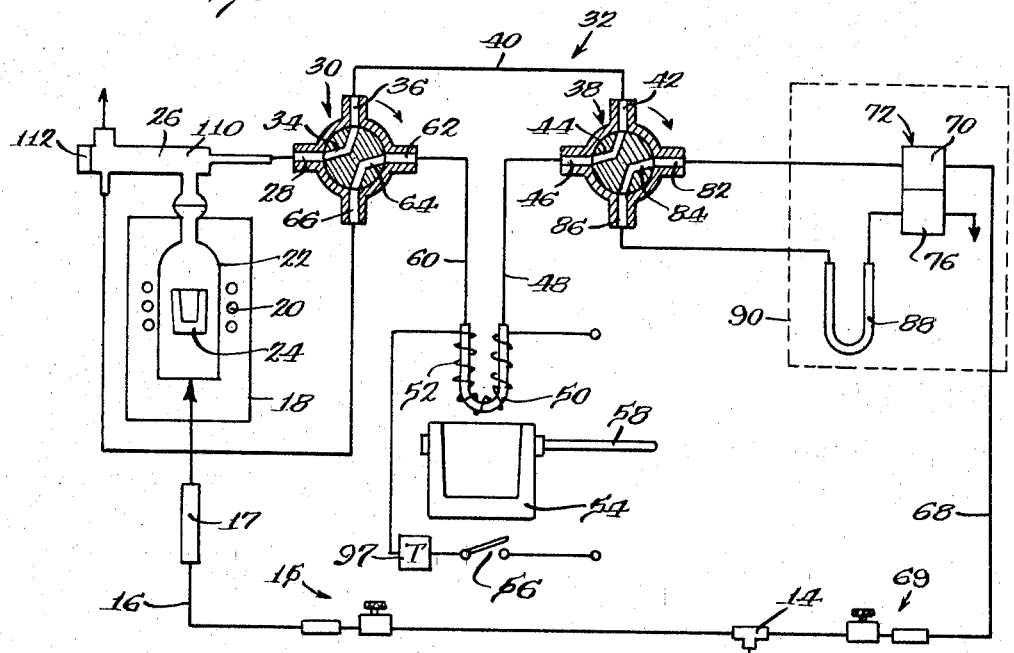
FIG. 1 is a somewhat diagrammatic view of the apparatus of my invention showing the arrangement of parts and the flow connections with elevational representations and sectional views of some of the principal components thereof.

The apparatus illustrated and described below as the exemplification of my invention is intended for the determination of nitrogen and oxygen in a steel sample. FIG. 1 shows a source of helium 10 having an emergent pipe 12 which leads to a T-fitting 14 dividing the helium stream in two. One branch 16 of the stream leads through a needle valve and flow meter 15 and a hot zirconium sponge filter 17 to remove oxygen and nitrogen from the helium stream. The stream then enters an induction furnace 18 having heating coils 20, an oven 22 and a crucible 24 therein. The gas flow continues through the oven and the sample loading device 26 to be later described. From the loading device flow proceeds into port 28 of the passage system 30 of the double four-way transfer stopcock 32 particularly illustrated in FIG. 4. The passage system 30 is that seen on the section 30—30 of FIG. 4, looking in the direction of the arrows. The stopcock being oriented as shown, flow continues through stopcock plug bore 34 and out through port 36 and is transferred to the stopcock passage system 38 by the glass tube 40 connected between port 36 and port 42 of system 38. The passage system 38 is that seen on the section 38—38 of FIG. 4, looking in the direction of the arrows. Again, the stopcock plug being oriented as shown, flow continues through stopcock plug bore 44 and through port 46 and duct 48 to a cold trap 50.

The cold trap 50 is a simple U tube desirably formed of stainless steel and containing 40 to 60 mesh, five angstrom Linde molecular sieve, a synthetic zeolite. Other sieve materials may be employed such as activated charcoal or silica gel. A resistance heating element 52 is shown encompassing the cold trap 50. However, the stainless steel trap may serve as its own heating element, the electrical connection being made directly to the tubular trap itself.

The cold trap is situated over a Dewar flask 54 containing liquid nitrogen. The Dewar flask is adapted to be moved upward to immerse the cold trap in the liquid nitrogen or to be moved downward to strike and close, at its bottom limit, a microswitch 56 through which the heating coil 52 is energized. A handle 58 may be provided on the Dewar flask by which it is elevated and lowered, the handle being engageable for instance, in a notch in appropriate cabinetry to hold the Dewar flask in its "up" position where the cold trap is immersed. As such techniques are entirely conventional, illustration is believed unnecessary.

From the cold trap 50 gas flow proceeds through a passage 60 into port 62 of passage system 30 of the stopcock 32. The plug being oriented as shown, the gas flow continues through plug bore 64 and out port 66. From port 66, the flow may discharge to the atmosphere or, as illustrated, lead to the loading device 26 to purge of air a sample to be tested, as will be later described.

The flow of the other part of the helium continues from the T-fitting 14 through a duct 68 having a needle valve and flow meter 69 therein to the reference side 70 of a measuring cell 72.

The use of thermal conductivity cells in detecting and measuring contaminants in gases is well known. The illustrated cell consists of the reference side 70 and a measuring side 76 each containing a thermistor 78 and 80 respectively, connected as two legs in a Wheatstone bridge as will be subsequently described.

The gas stream flows from the reference side 70 of the cell 72 into port 82 of the passage system 38, through plug bore 84 and out through port 86 into a chromatographic column 88, through the measuring side 76 of the conductivity cell 72 and out to atmosphere. The chromatographic column 88 contains the same sieve as the trap 50 in this particular embodiment, although other sieve materials may be employed. The column 88 and the conductivity cell 72 may be contained in an oven 90 for the maintenance of a desired ambient temperature.

Figures 5, 6:
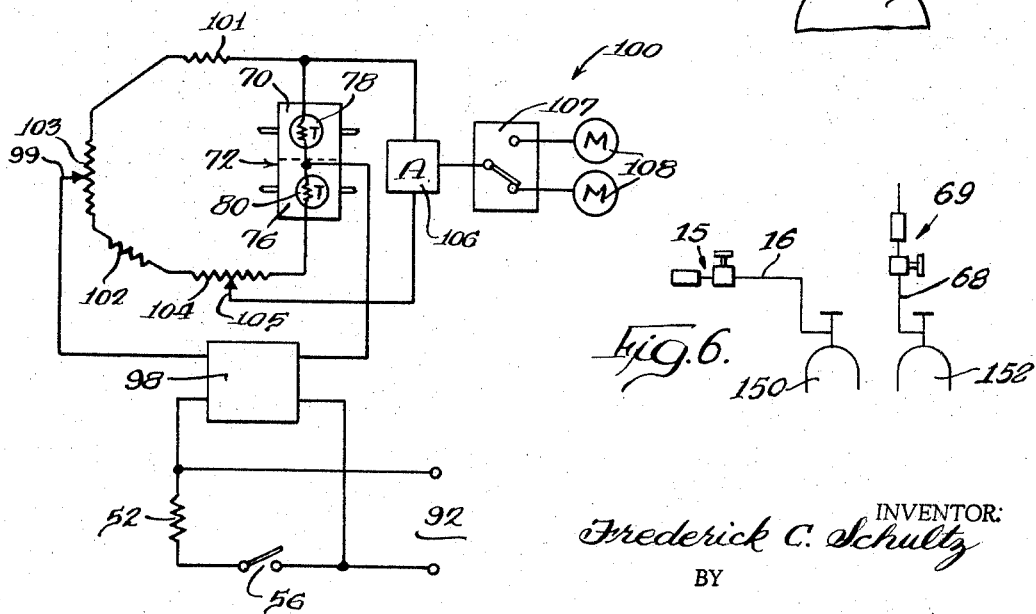
FIG. 5 is a diagram of the electrical circuit incorporated in my invention.
FIG. 6 is a partial diagrammatic view similar to FIG. 1 illustrating an alternative carrier gas supply system.

The electrical circuit of my invention is diagrammatically illustrated in FIG. 5. From a source of line power 92, current is delivered to the trap heater 52 through the Dewar-flask-operated switch 56 and a timer switch 97 which closes upon closure of switch 56 and remains closed—in the illustrated embodiment—for 15 seconds. Current is also delivered to a rectifier 98 which in turn supplies direct current to a Wheatstone bridge circuit 100. As illustrated, the legs of the bridge on one side consist of the thermistor 78, fixed resistor 101 and that part of a coarse adjust potentiometer 103 from one end to the movable contact 99 thereof. On the other side the legs consist of the thermistor 80, the resistance element of a fine adjust potentiometer 104, fixed resistor 102, and the other part of potentiometer 103 to the movable contact 99. The bridge element proper is connected between thermistor 78 and resistor 101 and to the movable contact 105 of potentiometer 104 and includes a DC amplifier 106, the output of which leads to a timer-actuated double throw switch 107. Each of the terminals of the switch 107 is connected to an integrator or integrating motor 108. The integrators 108 are low inertia DC motors manufactured by Electro-Methods Ltd. of Stevenhage, England, and are characterized by a velocity of rotation directly dependent on the voltage applied.

The loading device is particularly illustrated in FIGS. 2 and 3. It consists generally of a horizontal barrel 110 and a plunger 112 contained in the barrel. The barrel has a central enlarged chamber 113 and a relatively large diameter delivery column 114 extending from the chamber and terminating at its lower end in a ground socket joint 116 by which connection is made to the oven 22. The barrel extends outwardly at one end from the chamber 113 as tubing 120 of considerably reduced diameter which leads in turn to a connecting end 122 of still further reduced diameter adapted for connection to the transfer stopcock port 28. At the other end, the barrel extends from the chamber 113 as a cylindrical extension 124 having a diameter slightly less than that of the chamber. Extension 124 is open ended and has a large diameter loading port 126 on its top side adjacent the free end and a small diameter purging gas inlet 128 centered directly under the loading port on the bottom side. The gas inlet 128 may be connected to the port 66 of the transfer stopcock.

The plunger 112 is a cylindrical member having an enlarged head 130 at its outer end. At the other end a large diameter sample cavity 132 is formed having a small purging gas inlet port 134 in the bottom thereof. The plunger is grooved for the reception of O-rings 136 to block various leakages through the extension 124. Notably, O-ring 136a isolates the helium flow when the plunger is positioned to receive a sample through the loading port 126, and O-ring 136b isolates the flow when the plunger is in the illustrated sample dumping position. The plunger also has a small diameter bore 138 therethrough situated to be aligned with the inlet 128 and the loading port 126 when the sample cavity is in inverted position over the loading tube 114.

The transfer stopcock 32 is shown in elevation in FIG. 4 and in section on two planes in FIG. 1. Externally it consists of the usual tapered stopcock shell 140 and the correspondingly tapered stopcock plug 142 having a conventional handle 144. The plug is grooved at its lower end which protrudes through and beyond the shell, and a spring retainer 146 locks the plug in the shell. The characteristics of significance lie in the two-passage networks occurring on different planes transversely of the stopcock as particularly illustrated in FIG. 1 and the interconnection of the two systems through the U-bend 40.

The operation of my device will be readily understood from the foregoing description. The plunger 112 of the sample loading device will be withdrawn and rotated 180° from the position shown in FIG. 2 so that the sample cavity 132 faces upward and in alignment with the loading port 126. A sample of steel to be analyzed will be dripped into the sample cavity.

During this time helium is flowing from its source 10 through duct 16, through the zirconium sponge 17 to remove oxygen and nitrogen from the helium, through the oven, the loading device, and into port 28 of the transfer stopcock 32. The stopcock being positioned as shown, the flow proceeds through the passage system connecting tube 40 to the port 42 of the passage system 38, through the cold trap 50, port 62 of the stopcock system 30, out through port 66, through the purging duct 128 of the loading device and out through the loading port 126. Since the Dewar flask 54 is in its lowered position, switch 56 will be closed and the cold trap 50 therefore will have been heated. This flow of helium will therefore purge the oven and the cold trap of any residual gases from a previous determination and will likewise create a helium atmosphere about the sample to be introduced and displace the air therefrom. A one hole stopper may be inserted in the loading port 126 to prevent air diffusing back into the cavity 132.

The other branch of the helium flow through duct 68 runs through the reference side of the conductivity cell 72, into port 82 of the passage system 38, out port 86 into the chromatographic column 88 and out through the measuring side of the conductivity cell 72, thus purging the column.

The purged sample is introduced into the crucible by pushing in the loading device plunger 112 and rotating it through 180° to drop the sample from the cavity into the crucible. Thereupon the furnace is operated. The nitrides decompose to release the nitrogen. The oxygen of the oxides combines with the carbon monoxide with crucible and is carried over as carbon monoxide with the nitrogen in the helium stream. In the meantime the Dewar flask containing liquid nitrogen has been raised to cool the cold trap, thereby opening switch 56. These conditions continue until a sufficient time internal has elapsed to achieve a total transportation and absorption of the desired gases in the cold trap. Hole 138 in the plunger permits a continuity of flow through the furnace and trap when the plunger is in the sample dumping position. Thereafter the transfer stopcock is turned a quarter of a turn clockwise from the position illustrated in FIG. 1, the Dewar flask is lowered to make contact with switch 56, thus heating the cold trap briefly, and the loading device plunger is withdrawn to receive another sample.

Rotation of the stopcock continues the flow of helium through branch 16 through the oven into port 28 and out through port 66 of the passage system 30 and through the purging duct 128 and sample cavity 132 to purge the next sample to be introduced.

The flow of helium through the branch 68 of the helium source continues through the reference side 70 of the conductivity cell 72, in through port 82 and out through port 42 of the passage system 38, through the connecting duct 40 and out through port 62 of the passage system 30 into the now heated cold trap 50. From the cold trap the flow continues through duct 48 into port 46 and up through port 86 of the passage system 38 into the chromatographic column 88 and through the measuring side 76 of the conductivity cell. The helium stream thus sweeps the adsorbed gases out of the cold trap and into the chromatographic column. In this column they are effectively separated, the nitrogen emerging first and the carbon monoxide following. The presence of the contaminating gases in the helium stream unbalances the bridge circuit and causes current to flow in the bridge of the circuit. This current is amplified by the amplifier 106 and is fed first to the integrator 108 intended for nitrogen readings, and after an empirically determined time interval, is switched to the other integrator intended to read carbon monoxide quantities. The integrators respond both to the time and the concentration of the contaminating gases and therefore may be designed to read in terms of total quantities. The integrators may be calibrated against standard samples.

Following the completion of the analysis of the first sample, the transfer stopcock will be restored to its illustrated position, the cold trap immersed again in the Dewar flask and the loading device operated to introduce a new and now purged sample into the oven 22 for a repetition of the process.

The bridge will be initially balanced by turning the stopcock to cause helium flow through the cold trap 50 and column 88 with, however, no adsorbed gases in the system. A coarse adjustment may be made by moving contact 99 of potentiometer 103 and a fine adjustment by moving contact 105 of potentiometer 104 to obtain a condition of no current flow through the bridge.

Although I have described my apparatus as having a single source of carrier gas, it will be evident that separate sources may be used and the T-fitting 14 thereby eliminated. Thus, referring to FIG. 6, there are shown two gas cylinders 150 and 152 respectively individually connected to the ducts 16 and 68 so that the cylinder 150 provides gas for the loop running through the furnace to the sample purging port and exhaust and the cylinder 152 provides gas independently for the loop extending through the reference cell to the measuring cell and exhaust. In this fashion, different gases can be used in the two loops.

It will be evident from the foregoing description that my apparatus and method may be used for the detection of any gas affecting the conductivity cell and may be used for the separate measurement of mixed gases where these gases are chromatographically separable.

The described embodiment of my invention is directed to the detection and determination of nitrogen and oxygen in a steel sample. The nitrogen is obtained directly as molecular nitrogen from the decomposition of nitrides in the steel upon the heating thereof. The oxygen, as stated before, is detected as carbon monoxide, the oxides of the sample reacting with the carbon of the graphite crucible. This method of reduction of the oxides is desirable not only because it is easy but also because nitrogen and oxygen are not distinctly separated by a chromatographic column.

Sulphur and carbon might readily be detected in steel samples. In such case a stream of oxygen might readily be used as the first carrier gas and the carbon and sulphur oxidized to sulphur dioxide and carbon dioxide. These evolved gases would again be collected in the cold trap for subsequent release into a carrier stream which may or may not be the same as the first oxygen stream. For instance, a helium or argon stream may be used for the second carrier.

In the claims I have used the term "gas forming component" to include such solid elements as carbon and sulphur which have a readily produced gaseous compound by which the element may be measured.

The nitrogen cooled cold trap is likewise rather specific to the described nitrogen and oxygen determination. Other gases may be capable of being trapped in traps cooled to a lesser degree or even not cooled at all, i.e., at room temperature. Gases so trapped may require a higher degree of heating for their release than the described nitrogen and carbon monoxide. The term "cold trap" is, therefore, relative and relates only to the temperature needed for trapping as compared with the temperature necessary to release the particular gases being determined. It is the high degree of cooling necessary to trap the nitrogen and carbon monoxide that compels the use of helium as the first carrier. Were the need for cooling less, argon might well be employed as the carrier or nitrogen or, as described above, oxygen.

It will be appreciated that my invention is suited for the analysis of much more than steel samples. Other alloys may be analyzed in similar fashion, some of which may require special fluxing techniques. I contemplate the successful analysis of organic materials by the use of my method and apparatus. Measured quantities may be burned in a stream of oxygen and the evolved carbon dioxide, water vapor, nitrogen, etc. measured as described.

It will further be appreciated that I have described an embodiment only of my method and apparatus and that alternatives to the procedures or equipment will undoubtedly suggest themselves to those skilled in the art, and I therefore desire that my invention be regarded as being limited only as set forth in the following claims.

I claim:

1. Analytical apparatus for the measurement of gas forming components in a sample which comprises a first and second passage system to contain the flow of a first and second stream of carrier gases, said first system including in order: a source of carrier gas under pressure, a receptacle for receiving a sample to be determined, a furnace associated with said receptacle for heating said sample to effect the formation of the gas to be measured, and a gas escape, and said second system including a source of carrier gas under pressure, the reference side of a thermal conductivity cell, the measuring side of said cell, and a gas exhaust; a cold trap, means for varying the temperature of said cold trap between limits, and valving means operable alternately to insert said cold trap into said first stream between said receptacle and said escape and connecting said second system across said reference and measuring sides in isolation from said first system and connecting said cold trap into said second system between said reference side and said measuring side and connecting said first system downstream of said container directly to said escape in isolation from said second system.

2. A method for the rapid determination of a gas or gas forming component in consecutive samples which comprises providing a first continuous stream of carrier gas passing optionally into a cold trap and thence to exhaust or directly to exhaust and a second continuous stream of carrier gas passing optionally through the reference side of a measuring cell, said cold trap, and the measuring side of said cell or through said reference side and into said measuring side without the interposition of said cold trap, introducing a first sample into said first stream upwardly of said trap, heating the sample to release the subject gas therefrom to entrain the subject gas in the carrier stream to be transported into the cold trap wherein said subject gas is entrapped, said second stream establishing a base line in said reference cell, transferring said trap out of said first stream and into said second stream, warming said trap to release the subject gas into said second stream and determining the quantity thereof, and introducing a second sample into said first stream to be purged thereby while the subject gas of the first sample is being transferred from said cold trap and determined.

(References on following page)

References Cited

UNITED STATES PATENTS

| | | | |
|---|---|---|---|
| 3,304,159 | 2/1967 | Hinsvark | 73—23.1 X |
| 3,205,700 | 9/1965 | Lively et al. | 73—19 |
| 3,176,500 | 4/1965 | Coe | 73—19 |
| 3,053,077 | 9/1962 | Tracht | 73—23.1 |

OTHER REFERENCES

Duswalt et al.: Analytical Chemistry, vol. 32, No. 2, February 1960, pp. 272–274, copy in 73-23.1.

Martin: Journal of Chromatography, vol. 2 (1959), pp. 272–283, copy in 73-23.1.

Sundberg et al.: Analytical Chemistry, vol 32, No. 2, February 1960, pp. 274–277, copy in 73-23.1.

CHARLES A. RUEHL, Primary Examiner.

U.S. Cl. X.R.

73—19

UNITED STATES PATENT OFFICE
CERTIFICATE OF CORRECTION

Patent No. 3,427,863 February 18, 1969

Frederick C. Schultz

It is certified that error appears in the above identified patent and that said Letters Patent are hereby corrected as shown below:

Column 4, line 48, "monoxide with" should read -- of the graphite --.

Signed and sealed this 31st day of March 1970.

(SEAL)
Attest:

Edward M. Fletcher, Jr.  WILLIAM E. SCHUYLER, JR.
Attesting Officer  Commissioner of Patents